Inventor

By

Attorney

Aug. 25, 1970     T. J. COLLINS     3,525,176
SELECTIVE ROTATION CONTROL
Filed March 25, 1968     5 Sheets-Sheet 5
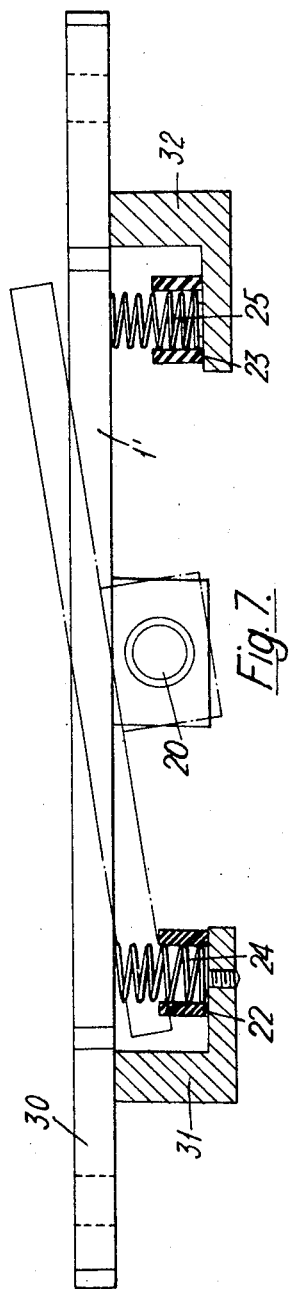
Inventor
By
Attorney

United States Patent Office 3,525,176
Patented Aug. 25, 1970

3,525,176
SELECTIVE ROTATION CONTROL
Terence J. Collins, Farnham, England, assignor to Tiltman Langley Limited, Redhill, Surrey, England
Filed Mar. 25, 1968, Ser. No. 715,792
Claims priority, application Great Britain, Mar. 29, 1967, 14,396/67
Int. Cl. E05d 15/02
U.S. Cl. 49—46                                                7 Claims

ABSTRACT OF THE DISCLOSURE

The disclosure is of a reversible turnstile mechanism in which a three bar turnstile of tripod configuration is mounted for rotation on its own axis (as is known) and for angular movement about a second normally vertical axis according to the required direction of passage. This enables provision to be made for mechanism such as coin release or unidirectional locking to be selectively employed in relation to the required direction of passage.

---

This invention relates to an improved mechanism for the selective control of the rotation or part rotation of a shaft, hub or similar device. It is of particular application as a mechanism forming part of a turnstile for controlling the passage of individual people entering or leaving a public service vehicle.

The requirements of such an improved mechanism are that normally the shaft should be rigidly locked and that on the performance of an operation such as the insertion of a coin or the movement of an electric switch the shaft should be permitted to turn through a given angle and then become rigidly locked once more. This cycle can be repeated over and over again, the shaft always turning in a chosen direction. Additional requirements are that it must be possible to change the chosen direction when necessary and also that by further choice, the shaft should be allowed to free-wheel in either direction or in one direction only. Still further requirements are that the shaft, in the absence of any external force, should automatically come to rest in a rigidly locked position and that when in such a position there should be no backlash.

According to the invention such a mechanism comprises a fixed member through which passes the shaft to be controlled, a second member attached to the shaft for rotation therewith, stops which may be in the form of rollers mounted on the second member, spring-loaded pawls pivoted to the fixed member and having profiles co-operating with the rollers in such a manner as to control the rotation of the shaft in accordance with the angular positions of the pawls and means for controlling such angular positions.

In the preferred mechanism, suitable for the control of a three bar turnstile, the second member has three rollers co-operating with two spring-loaded pawls and the spring is conveniently anchored at each end to one of the pawls in such a manner as to urge the pawls towards each other and into contact with the rollers. The angular position of each pawl is preferably controlled by a release solenoid which may be energised either by the insertion of a coin in a coin box or by the operation of an external switch. A single microswitch operated by the movement of one of the pawls serves to de-energise each solenoid at the appropriate time.

The combination of this mechanism with a turnstile also forms part of the invention.

In order to enable a turnstile arm to tend to remain horizontal through a certain angle of turnstile rotation, the whole turnstile is mounted on an element which is angularly movable for rocking about an axis inclined with the axis of rotation of the turnstile. The limits of rocking are established by a pair of rubber buffers, and centering springs tend to oppose the rocking movement.

A preferred embodiment of the invention, as applied to a three bar turnstile, will now be described by way of example with reference to the accompanying drawings, in which:

FIG. 7 is a view showing the turnstile mounting element.

The same reference numerals are used throughout for corresponding parts of the apparatus.

Figure 1:
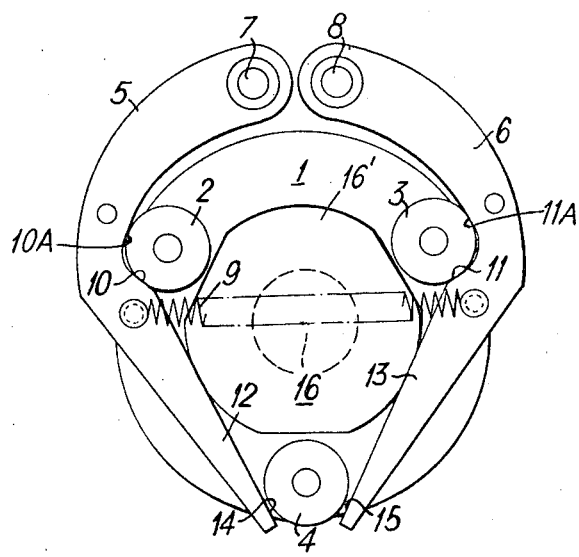
FIGS. 1 to 4 are diagrammatic sketches showing different phases in the operation of the locking mechanism.

Referring first to FIGS. 1 to 4, a member 1 attached for rotation with the turnstile, being mounted for rotation with turnstile shaft 16, carries three rollers 2, 3 and 4 spaced at 120° one from another. Two pawls 5 and 6 are pivoted at 7 and 8 to a fixed part of the structure 1′ (see FIG. 6) and are internally profiled, as shown in the drawings. They are interconnected by a spring 9.

FIG. 1 shows the mechanism in the locked position. The rollers 2 and 3 are in contact with shoulders 10 and 11 and surfaces 10A and 11A all of which form part of the inside profiles of the pawls 5 and 6. It can be seen that the contact with the shoulders effectively locks the member 1 against rotation in either direction. The mechanism is so proportioned that when in the position shown, a line joining the centre of the roller 2 to the centre of the pivot 7 is at right-angles to a line joining the centre of this roller to the centre of rotation of the member 1. Furthermore the shoulder 10 lies parallel to this second line. The same applies to the other side of the mechanism and this dimensioning provides smooth and fast locking at the completion of each 120° rotation of the member 1. The pawls 5 and 6 have extensions 12 and 13 respectively and it can be seen in FIG. 1 that when the member 1 is in a position such as to be locked by the rollers 2 and 3, then the roller 4 is positioned between the ends 14 and 15 of these extensions. In this position, the extensions 12 and 13 are in contact with the sides of a shock-absorbing rubber buffer 16′ mounted on the member 1 and so dimensioned as to allow a small clearance between the ends of the extensions and the roller 4.

Figure 2:
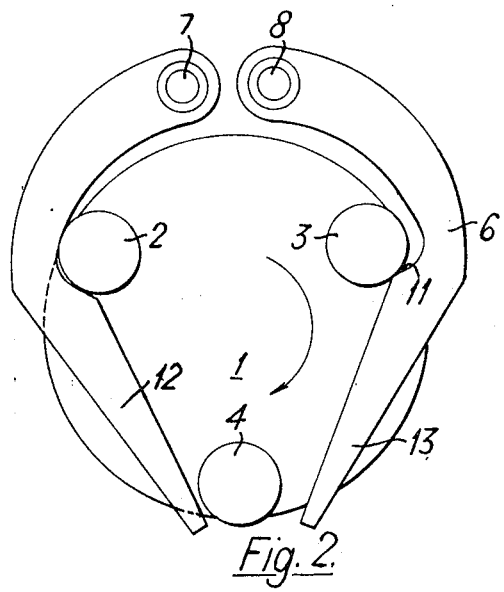

FIG. 2, from which the shaft, buffer and spring have shows the unlocking action. It is assumed that a release solenoid has been energised by the insertion of a coin in a coin box and the action of this solenoid is to pivot the arm 6 to the position shown. A small pivoting movement is all that is necessary to alter the relative positions of the roller 3 and shoulder 11 to a position in which a clockwise torque exerted on the member 1 by a person pushing against an arm of the turnstile is able to rotate the member 1.

Figure 3:
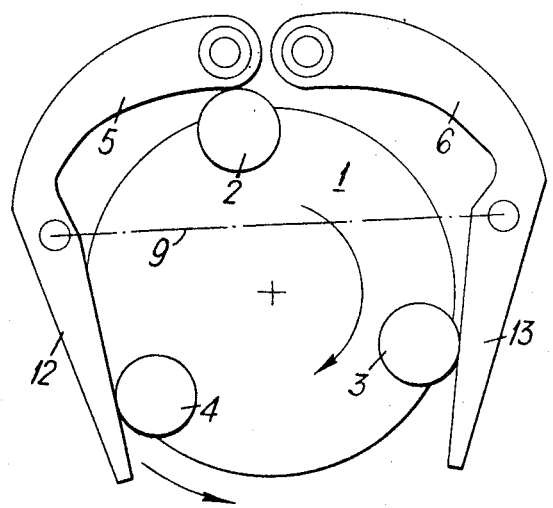

FIG. 3 shows the mechanism after a rotation of just less than 60° from the locked position of FIG. 1. During this part of the rotation the pawls 5 and 6 are both being urged outwards by the camming action of the rollers 4 and 3 respectively, which are now bearing against the inner surfaces of the extensions 12 and 13. This results in an increasing tension in the spring 9 and opposing torques are thus applied to the member 1 by this spring tension acting on the rollers 4 and 3 by way of the extensions 12 and 13 respectively. It can be seen from the figures that during the first 60° of rotation from the position shown in FIG. 1, the reaction between the roller 4 and the extension 12 is acting at the end of a longer effective lever arm than is the reaction between the roller 3 and the extension 13. Since both extensions are subjected to an equal force from the spring 9, it follows that the resultant torque on the member 1 is a restoring torque to be overcome by a person pushing on the turnstile. This torque is at a maximum immediately after unlocking and reduces as rotation proceeds. After a rotation of exactly 60°, at which point a microswitch is tripped to de-energise the solenoid, the arms 12 and 13 are exerting equal torques on the member 1 and from 60° to the next locked position, after a rotation of 120°, the effect of the extension 13 predominates to reverse the torque, thus assisting the exit of a person from the turnstile. It can thus be seen that in the absence of any external torque the member 1 must always either return to one locked position or advance to the next. It can never remain in an intermediate position.

Figure 4:
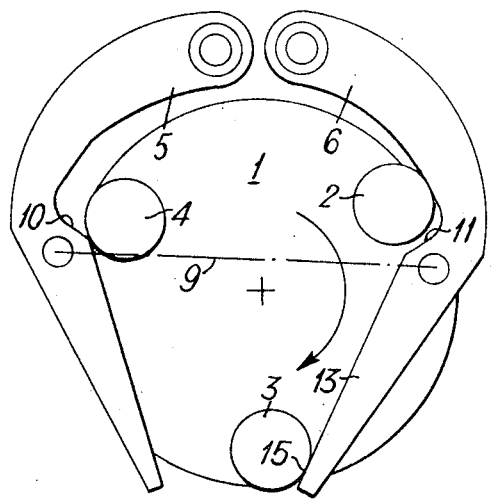

FIG. 4 shows the mechanism immediately before the next locked position. The pawl 6 and its extension 13 are now in their initial position, further movement being prevented by the presence of the buffer 16' (see FIG. 1). The shoulder 11 is thus in a position to prevent any overrun whilst the pawl 5, still under the influence of the spring 9, is about to start a fall off into its initial position. This fall off will be fast on account of the shoulder 10 being approximately tangential to the roller. In the final position the rollers 2 and 4 will be in contact with the shoulders 10 and 11, thus rigidly locking the member 1 against rotation in either direction, whilst the roller 3 will now be positioned between the ends 14 and 15 of the extensions 12 and 13.

Since the mechanism is symmetrical, an outward movement of the pawl 5, effected by another solenoid, will permit anticlockwise rotation of the member 1. The sequence of events is just as described above and it can be seen that the restoring torque is the same, irrespective of the direction of rotation. If either of the pawls 5 and 6 is held in its unlocked position, for example by the driver of a vehicle operating a switch so as to energise the corresponding solenoid and cut out the microswitch, then the member 1 will be able to freewheel in one or other direction or in both directions if both solenoids are continuously energised.

Figure 5:
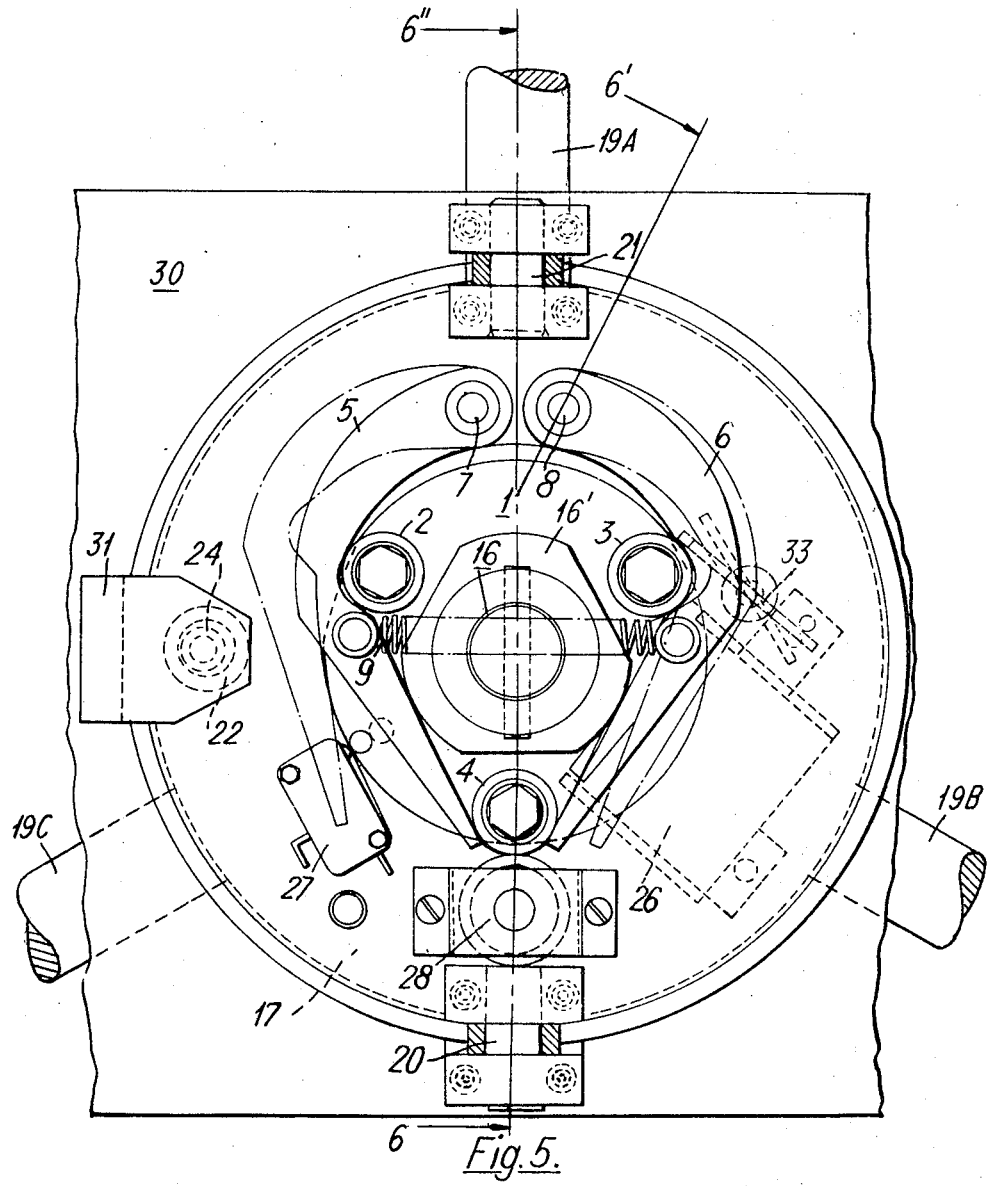
FIG. 5 is an end view, as seen from the left of FIG. 6, partly in section, showing the locking mechanism attached to the shaft of a turnstile and showing the mounting of the turnstile as a whole.
Figure 6:
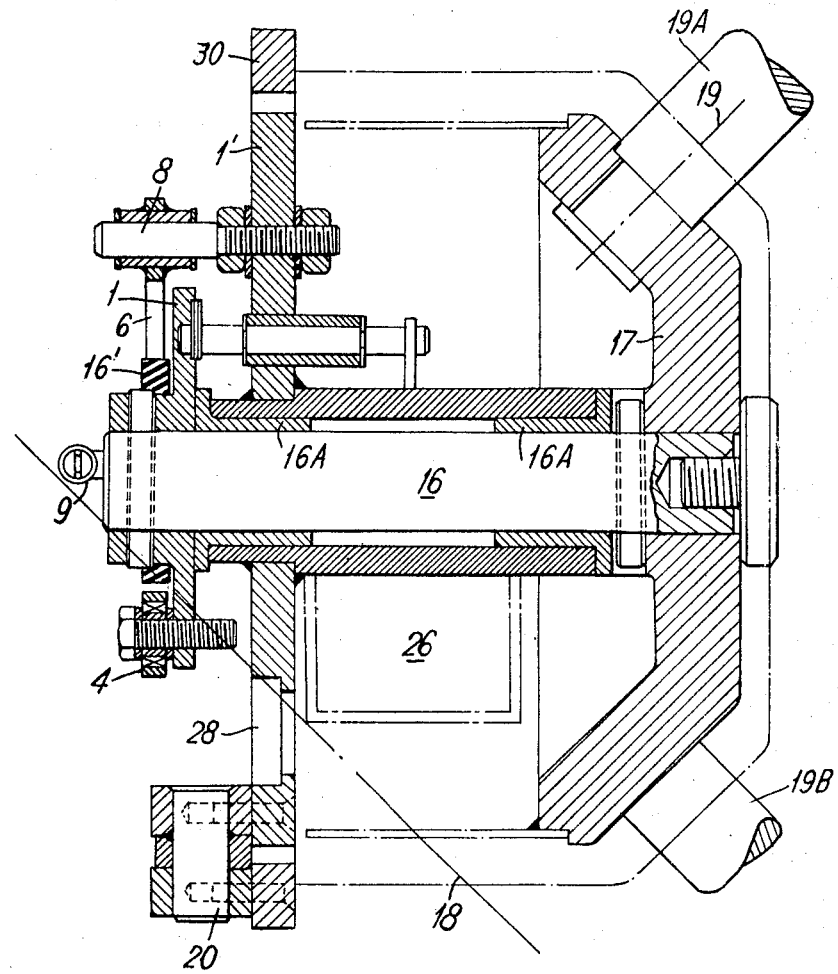
FIG. 6 is a sectional elevation taken in a plane generally along the line 6–6′ of FIG. 5, with the section of the turnstile hub taken in the plane along the line 6–6″ of FIG. 5.

Referring now to FIGS. 5, 6 and 7, the above mechanism is shown attached to one end of a shaft 16 which carries at its outer end the hub 17 of a three-armed turnstile. The shaft 16 is mounted for rotation in a bearing 16A supported by element 1' and is inclined downwardly and outwardly from the vertical which is indicated by a line 18. The hub 17 carries three turnstile arms which are suitably angled and symmetrically disposed so as to lie in the wall of an imaginary cone having the shaft 16 as its axis. A line 19 shows the centre line of that one 19A of the three arms which is for the time being horizontal. The remaining arms 19B and 19C are angled downwardly. The whole turnstile is carried on element 1'. Element 1, in turn, is carried by trunnions 20 and 21 (see FIG. 5) which lie on an axis which forms an angle with the axis of rotation of the turnstile and which are journaled on a frame member 30. This allows the turnstile to rock through a small angle as shown in FIG. 7, the limit of rock being determined by rubber buffers 22 and 23 mounted on brackets 31 and 32 on frame member 30. Centering springs 24 and 25 are provided. The effect of this rocking movement is to cause that turnstile arm against which a person is pushing to remain horizontal through a certain angle of turnstile rotation, thus minimising inconvenience to such a person.

The main parts of the mechanism shown in FIGS. 1 to 4 are shown in FIGS. 5 and 6 with the same reference numerals. Each of the pawls 5 and 6 has a co-operating release solenoid, one of which is shown at 26 coupled to pawl 6 through linkage 33 and the single trip microswitch, operated by the pawl 5, is shown at 27. The electrical connections to the solenoids and the microswitch are taken through a connector socket 28.

I claim:

1. A reversible turnstile for controlling the passage of individual people, comprising a member rotatably borne in a bearing, at least three arms carried on said member and disposed symmetrically so as to lie in the wall of an imaginary cone about a first axis, said first axis being the axis of rotation of said member; an element which supports said bearing, said element being angularly movable about a second axis which is inclined to said first axis so as to permit said first axis to swing through an angle as seen in plan when said element rocks about said second axis; and a mechanism coupled to release said member for the selective control of the rotation of said member.

2. A reversible turnstile according to claim 1 in which the angular movement of said element about said second axis is on either side of a central position so as to accommodate individual people passing through the turnstile in either direction.

3. A reversible turnstile according to claim 2 in which said arms are so disposed that that arm which for the time being is in contact with a person passing through the turnstile is in an approximately horizontal position, the effect of said angular movement being such as to result in said horizontality being substantially maintained through a certain angle of turnstile rotation, thus minimizing inconvenience to said person.

4. A reversible turnstile according to claim 3 in which said rotatable member comprises a shaft passing through said element, and in which said mechanism comprises a second member rigidly attached to said shaft for rotation therewith, stops in the form of rollers mounted on said second member, spring-loaded pawls pivoted to said element and having profiles co-operating with said rollers in such a manner as to control the rotation of the shaft, in accordance with the angular position of said pawls, and means for controlling such angular positions.

5. A mechanism for the selective control of the rotation of a shaft carrying a first and rotating member, comprising a second and relatively fixed member through which passes said shaft, a third member attached to said shaft for rotation therewith, three stops in the form of rollers mounted on the said third member, two pawls pivoted to said second member, a spring anchored at each end to one of said pawls in such a manner as to urge the pawls towards each other and into contact with the rollers, said pawls having profiles co-operating with said rollers in such a manner as to control the rotation of the shaft in accordance with the angular positions of said pawls, and means for controlling such angular positions.

6. A mechanism according to claim 5 in which said first and rotating member carries the three arms of a three-bar turnstile, said shaft being carried by said second member, said second member being angularly movable about an axis which is inclined to the axis of rotation of said shaft so as to permit said shaft to swing through an angle as seen in plan, such angular movement being on either side of a central position.

7. A mechanism as recited in claim 5, wherein said profiles of said pawls include a shoulder against which said rollers are adapted to be locked and said shoulder lies in a first line at right angles to a second line joining the center of said roller, when in locked position, and the center of pivot of a pawl against which it is locked, said first line being parallel to a third line joining the center of said roller, when in said locked position, and the center of rotation of said third member.

References Cited

UNITED STATES PATENTS

| | | | |
|---|---|---|---|
| 1,495,285 | 5/1924 | Wilkin | 49—46 |
| 1,933,725 | 11/1933 | Frankford | 49—35 |
| 2,007,132 | 7/1935 | Perey | 49—47 |
| 2,019,326 | 10/1935 | Stuart | 49—47 |
| 2,144,718 | 1/1939 | Gersbach | 49—47 |
| 2,204,897 | 6/1940 | Kilpatrick | 49—35 X |
| 3,383,797 | 5/1968 | Trikilis | 49—47 |
| 3,397,486 | 8/1968 | Foxwell et al. | 49—47 |

DENNIS L. TAYLOR, Primary Examiner